US007729719B2

(12) United States Patent
Bergstrom et al.

(10) Patent No.: US 7,729,719 B2
(45) Date of Patent: Jun. 1, 2010

(54) RLC WINDOW SIZE RECONFIGURATION

(75) Inventors: Joakim Bergstrom, Stockholm (SE); Gert-Jan Van Lieshout, Apeldoorn (NL); Johan Torsner, Masaby (FI)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 607 days.

(21) Appl. No.: 10/551,080

(22) PCT Filed: Apr. 6, 2004

(86) PCT No.: PCT/SE2004/000543

§ 371 (c)(1),
(2), (4) Date: Aug. 2, 2007

(87) PCT Pub. No.: WO2004/091130

PCT Pub. Date: Oct. 21, 2004

(65) Prior Publication Data

US 2009/0221242 A1    Sep. 3, 2009

(30) Foreign Application Priority Data

Apr. 7, 2003    (SE) .................................... 0301048

(51) Int. Cl.
*H04M 1/00* (2006.01)
(52) U.S. Cl. .................... 455/550.1; 455/73; 455/450; 455/67.11; 370/346; 370/449
(58) Field of Classification Search .............. 455/550.1, 455/73, 452, 509, 453, 450, 525, 67.11, 68, 455/423, 422.1, 127.1, 501.1, 561; 370/346, 370/449, 349, 328, 352
See application file for complete search history.

(56) References Cited

U.S. PATENT DOCUMENTS 7,085,540 B2 *  8/2006  Cao et al. ..................... 455/68
7,447,181 B1 * 11/2008  Forssell ....................... 370/336
2002/0097809 A1    7/2002  Jiang
2004/0047331 A1 *  3/2004  Jang ............................ 370/346
2004/0170179 A1 *  9/2004  Johansson et al. ........ 370/395.2
2005/0180371 A1 *  8/2005  Malkamaki ................. 370/342

OTHER PUBLICATIONS

Swedish Patent Office, International Search Report for PCT/SE2004/000543, Apr. 13, 2004.
Ericsson: "RLC Window Size Reconfiguration", TSG-RAN Working Group 2 Meeting #35, Feb. 7-11, 2003, R2-030769, Seoul, Korea.

* cited by examiner

*Primary Examiner*—Tan Trinh
(74) *Attorney, Agent, or Firm*—Roger S. Burleigh

(57) ABSTRACT

A telecommunications device comprises a transceiver (33); a radio link control entity (50); and, a radio link control (RLC) buffer memory (150). The transceiver (33) which enables the device to communicate over an air interface (32). The radio link control entity (50) forms uplink RLC protocol data units (PDUs) for transmission over the air interface (32) and receives downlink RLC protocol data units (PDUs) over the air interface (32). The radio link control (RLC) buffer memory (150) is configured to include a transmitter buffer for storing the uplink RLC protocol data units (PDUs) and a receiver buffer for storing the downlink RLC protocol data units (PDUs). The radio link control entity includes RLC reconfiguration logic means (200) which reconfigures at least one of a size of a transmitter buffer window and a size of a receiver buffer window. In performing the reconfiguration, the RLC reconfiguration logic means implements a strategy for handling at least one of (1) downlink RLC protocol data units (PDUs) which are outside a new receiver buffer window; and (2) uplink RLC protocol data units (PDUs) which are either outside a new transmitter window or whose receipt by the radio access network has not been positively acknowledged.

21 Claims, 10 Drawing Sheets

RLC WINDOW SIZE RECONFIGURATION

BACKGROUND

1. Field of the Invention

The present invention pertains to wireless telecommunications, and particularly to method and apparatus for reconfiguration of radio link control (RLC) parameters during a connection.

2. Related Art and Other Considerations

In a typical cellular radio system, wireless user equipment units (UEs) communicate via a radio access network (RAN) to one or more core networks. The user equipment units (UEs) can be mobile stations such as mobile telephones ("cellular" telephones) and laptops with mobile termination, and thus can be, for example, portable, pocket, hand-held, computer-included, or car-mounted mobile devices which communicate voice and/or data with radio access network. Alternatively, the wireless user equipment units can be fixed wireless devices, e.g., fixed cellular devices/terminals which are part of a wireless local loop or the like.

The radio access network (RAN) covers a geographical area which is divided into cell areas, with each cell area being served by a base station. A cell is a geographical area where radio coverage is provided by the radio base station equipment at a base station site. Each cell is identified by a unique identity, which is broadcast in the cell. The base stations communicate over the air interface (e.g., radio frequencies) with the user equipment units (UE) within range of the base stations. In the radio access network, several base stations are typically connected (e.g., by landlines or microwave) to a radio network controller (RNC). The radio network controller, also sometimes termed a base station controller (BSC), supervises and coordinates various activities of the plural base stations connected thereto. The radio network controllers are typically connected to one or more core networks. The core network has various service domains, with an RNC having an interface to these domains.

One example of a radio access network is the Universal Mobile Telecommunications (UMTS) Terrestrial Radio Access Network (UTRAN). The UMTS is a third generation system which in some respects builds upon the radio access technology known as Global System for Mobile communications (GSM) developed in Europe. UTRAN is essentially a radio access network providing wideband code division multiple access (WCDMA) to user equipment units (UEs). The Third Generation Partnership Project (3GPP) has undertaken to evolve further the UTRAN and GSM-based radio access network technologies.

The Universal Mobile Telecommunications (UMTS) Terrestrial Radio Access Network (UTRAN) accommodates both circuit switched and packet switched connections. There are several interfaces of interest in the UTRAN. The interface between the radio network controllers (RNCs) and the core network(s) is termed the "Iu" interface. The interface between a radio network controller (RNC) and its base stations (BSs) is termed the "Iub" interface. The interface between the user equipment unit (UE) and the base stations is known as the "air interface" or the "radio interface" or "Uu interface". An interface between radio network controllers (e.g., between a Serving RNC [SRNC] and a Drift RNC [DRNC]) is termed the "Iur" interface.

The radio network controller (RNC) controls the UTRAN. In fulfilling its control role, the RNC manages resources of the UTRAN. Such resources managed by the RNC include (among others) the downlink (DL) power transmitted by the base stations; the uplink (UL) interference perceived by the base stations; and the hardware situated at the base stations.

A UMTS Terrestrial Radio Access Network (UTRAN) responds to radio access service requests by allocating resources needed to support a communication with a user equipment unit (UE). A procedure for establishing a radio access bearer is described in Technical Specification 3GPP TS 25.931 v 5.1.0, which is incorporated herein by reference. A radio access bearer (RAB) is a logical connection with the user equipment unit (UE) through the UTRAN and over the radio air interface and corresponds to a single data stream. For example, one radio access bearer may support a speech connection, another bearer may support a video connection, and a third bearer may support a data packet connection. Each radio access bearer is associated with quality of service (QoS) parameters describing how the UTRAN should handle the data stream. Although the term "radio access bearer" is sometimes used for purposes of the following description, the invention applies to any type of "connection," and is not limited to logical connections like RABs, a particular type of physical connection, etc.

To initiate a radio access bearer service, a request is transmitted to the UTRAN for communication with a user equipment unit (UE). One or more parameters accompany the radio access bearer service request. When establishing each bearer, the UTRAN "maps" or allocates the radio access bearer to physical transport and radio channel resources through the UTRAN and over the radio air interface, respectively. The mapping is based on one or more parameters associated with the radio access bearer service request.

In the Universal Mobile Telecommunications System (UMTS), a Radio Link Control (RLC) layer with its RLC protocol is interposed between a higher layer (such as an Internet Protocol (IP) Layer) and a Medium Access Control (MAC) layer. Radio link control (RLC) is a protocol layer that has various uses. The radio link control (RLC) has several modes of operation, including the transparent mode, the unacknowledged mode, and the acknowledged mode (AM). The RLC PDUs used in AM mode are called AMD PDUs (for RLC PDUs carrying user data. The mode of operation is selected according to the requirements of the higher layer. The radio link control (RLC) is used both for data flows and also for signaling flows.

FIG. 1 shows a Radio Link Control (RLC) layer 10 which transmits RLC PDUs (Protocol Data Units) to, and receives RLC PDUs from, the Medium Access Control (MAC) layer 11. In the illustrative example of FIG. 1, the Medium Access Control (MAC) layer 11 functions as the "lower layer" relative to the RLC layer; the "higher layer" 12 can be a layer such as TCP/IP layer (e.g., IP layer). The Medium Access Control (MAC) layer 11 is responsible, e.g., for mapping between logical channels and transport channels, priority handling, and scheduling of data flows on transport channels.

A radio access bearer (RAB) is established for each service. For each radio access bearer at least one RLC entity is established in both the user equipment unit and in the UTRAN. In the case of AM RLC there is one entity established, in the case of UM and TM there may be one downlink and one uplink RLC entity (or only a single RLC entity in one direction.

FIG. 1, shows, for an AM mode, an RLC entity 10-UE is provided in a user equipment unit (UE) and a RLC entity 10-RAN is provided in the UTRAN. With respect to the lower layer (e.g., Medium Access Control (MAC) layer 11), each RLC entity has a transmitting side and a receiving side. With its RLC PDUs, the RLC protocol of the Radio Link Control (RLC) layer supports the in-sequence delivery of higher level Service Data Units (SDUs) (which, in the illustration of FIG. 1, are TCP/IP IP packets). The Radio Link Control (RLC) layer is described in more detail in 3GPP TS 25.322 V6.0.0 (2003-12), $3^{rd}$ Generation Partnership Project; Technical Specification Group Radio Access Network; RLC Protocol Specification (Release 6), which is incorporated herein by reference.

Some limited code-type error recovery capability (e.g., convolutional coding) is provided over the air interface (i.e., radio interface). Over the air interface, such error recovery is performed locally with a local retransmission protocol, wherein all data in a transmission buffer is cached until it has been successfully delivered. In this regard, for example, the Radio Link Control (RLC) protocol of the Radio Link Control (RLC) layer has its local retransmission protocol—the Automatic Repeat Request (ARQ) protocol.

Consider the scenario of a user equipment unit (UE) with UE reference class 384 kbps. According to Technical Specification 3GPP TS 25.306 v 5.70, which is incorporated herein by reference, typical RLC capabilities for this UE class feature 50 Kbyte UE memory and a maximum of six AM (acknowledge mode) RLC entities. Thus, this user equipment unit (UE) can potentially use three parallel packet switched (PS) RABs. But, for the sake of simplicity, in this present scenario assume that this user equipment unit (UE) operates with two simultaneous PS RABs, e.g. two parallel interactive RABs or one interactive and one streaming RAB.

For an RLC entity which operates in AM mode, a mechanism which functions like a sliding window is used to control the flow of RLC packet data units (PDUs). When the first PS RAB is setup for the user equipment unit (UE) of this scenario, the UTRAN can not yet know if a second (or even a third ) PS RAB will be setup in the future. So if the RLC window size of the first PS RAB can not be reduced when a subsequent RAB is setup, then the UTRAN must take into account the memory usage of other RABs that may potentially be setup in the future. For example, to allow, e.g., two parallel PS RABs, UTRAN can only allocate half of its available UE memory for the first PS RAB.

In this scenario, if only the first PS RAB were to be setup, UTRAN could possibly allocate the whole remaining memory for the first PS RAB, e.g. a window size 512 in downlink and 256 in uplink, resulting in a total memory usage of 42 kbyte. But without the ability to reconfigure RLC window size, such ample memory allocation for the first PS RAB cannot occur. This is because the potential memory usage of a second PS RAB needs to be considered at the outset when the first PS RAB is setup (regardless of whether the second PS RAB will ever actually be setup). As a result, the RLC memory for the first RS RAB (and thus the RLC window size for the first PS RAB) can only be configured to, e.g., 256 in downlink and 128 in uplink. Naturally, this results in reduced performance, particularly before the second PS RAB is setup (which may never occur).

Especially for higher data rates, e.g. 384 kbps, the RLC window size has a significant impact on the performance in terms of delay/throughput. Since two parallel PS RABs may only be used in a fraction of the PS connections, this implies that a large amount of the UE memory is unused for most UEs and the throughput for PS connections unnecessarily low. The performance reduction is even more acute when cases of three parallel PS RABs are considered: the UTRAN can only allocate one third of the available UE memory when setting up the first PS RAB.

On the other hand, if the RLC window size could effectively be reduced at reconfiguration, the UTRAN could possibly allocate the whole memory for the first PS RAB. Then, if a second PS RAB is later setup, the window sizes could be reconfigured to suit the number of simultaneous RABs.

As it turns out, RRC signalling standards currently nominally support reconfiguration of RLC parameters during a connection, e.g. with a RADIO BEARER RECONFIGURATION message. The reconfiguration of RLC window size is ostensibly supported according to Technical Specification 3GPP TS 25.331 v 3.17.0 section 8.2.2.3 and 8.6.4.9, which is incorporated herein by reference.

However, the actions related to such a reconfiguration, particularly a reduction of the RLC window size, are not explicitly specified, e.g., neither in the above-mentioned Technical Specification 3GPP TS 25.322 nor in Technical Specification 3GPP TS 25.331. v 3.17.0, both which are incorporated herein by reference. Moreover, when the window size is decreased the UE actions are not unambiguous and potentially very problematic.

What is needed, therefore, and an object of the present invention, is an effective technique for implementing a decrease of the RLC window size.

BRIEF SUMMARY

A telecommunications device comprises a transceiver; a radio link control entity; and, a radio link control (RLC) buffer memory. The transceiver which enables the device to communicate over an air interface. The radio link control entity forms uplink RLC protocol data units (PDUs) for transmission over the air interface and receives downlink RLC protocol data units (PDUs) over the air interface. The radio link control (RLC) buffer memory is configured to include a transmitter buffer for storing the uplink RLC protocol data units (PDUs) and a receiver buffer for storing the downlink RLC protocol data units (PDUs). The radio link control entity includes RLC reconfiguration logic means which reconfigures at least one of a size of a transmitter buffer window and a size of a receiver buffer window. In performing the reconfiguration, the RLC reconfiguration logic means implements a strategy for handling at least one of (1) downlink RLC protocol data units (PDUs) which are outside a new receiver buffer window; and (2) uplink RLC protocol data units (PDUs) which are either outside a new transmitter window or whose receipt by the radio access network has not been positively acknowledged.

In a first example embodiment and mode of operation when the device is a user equipment unit, the radio link control (RLC) entity (A) discards any downlink RLC protocol data units (PDUs) which were received as being within the old receiver buffer window but which are outside the new receiver buffer window; and (B) retains in the radio link control (RLC) buffer memory any uplink RLC protocol data units (PDUs) whose receipt by the radio access network has not been positively acknowledged.

In the discarding of downlink RLC protocol data units (PDUs) which were received as being within the old receiver buffer window but which are outside the new receiver buffer window, the radio link control entity does not negatively acknowledge the discarded downlink RLC protocol data units. In view of the retaining of RLC protocol data units (PDUs) whose receipt by the radio access network has not been positively acknowledged, the radio link control can retransmit (after the reconfiguration) the uplink RLC protocol data units (PDUs) which were negatively acknowledged by the radio access network.

As a modification of the first embodiment and mode for the user equipment unit, the radio link control entity optionally may not require segmentation of a service data unit (SDU)

received from a higher layer when, after the reconfiguration, the radio link control (RLC) buffer memory experiences a memory size constraint.

In a second example embodiment and mode of operation when the device is a user equipment unit, the radio link control (RLC) entity (A) retains all downlink RLC protocol data units (PDUs) stored in the receiver buffer even if outside the new receiver buffer window until the receiver buffer window can be advanced; (B) retains all downlink RLC protocol data units (PDUs) stored in the receiver buffer even if outside the new receiver buffer window.

In a variation thereof, the second example embodiment and mode optionally performs a check for capacity strain for the radio link control (RLC) buffer memory. In case of capacity strain, the RLC entity can optionally perform protective measures.

As a first example memory capacity check, the radio link control entity can check whether receipt of a Service Data Unit (SDU) from a high layer would exceed capacity of the radio link control (RLC) buffer memory and (if so) decide not to process the SDU. The first example capacity memory check performed by the radio link control entity can comprise determining whether the buffer memory is sufficient to store acknowledge mode RLC protocol data units (AMD PDUs) having a sequence number SN which satisfies $VT(A) < SN < VT(S)$ for acknowledge mode RLC entities. In this first example capacity memory check, $VT(A)$ is a sequence number following the last in-sequence acknowledged AMD PDU; and $VT(S)$ is a sequence number for a next AMD PDU to be transmitted for a first time.

As a second example capacity memory check, the radio link control entity can check whether receipt of a Protocol Data Unit (PDU) from the radio access network would exceed capacity of the radio link control (RLC) buffer memory and (if so) decide to ignore the PDU. The second example capacity memory check performed by the radio link control entity can comprise determining whether the buffer memory is sufficient to store acknowledge mode RLC protocol data units (AMD PDUs) having a sequence number SN which satisfies $VR(R) < SN < VR(H)$ for all acknowledge mode RLC entities. In this second example capacity memory check, SN is the sequence number of the PDU; $VR(R)$ is a sequence number following the last in-sequence AMD PDU received; and $VR(H)$ is a sequence number following a highest sequence number of any received AMD PDU.

When the telecommunications device involved in the reconfiguration is a radio access network node, the RLC reconfiguration logic keeps all PDUs in the downlink at the reconfiguration. Similarly, on the transmitter side, upon reconfiguration all PDUs in the uplink are also kept since the user equipment unit may or may not discard uplink data upon reconfiguration.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well-known devices, circuits, and methods are omitted so as not to obscure the description of the present invention with unnecessary detail. Moreover, individual function blocks are shown in some of the figures. Those skilled in the art will appreciate that the functions may be implemented using individual hardware circuits, using software functioning in conjunction with a suitably programmed digital microprocessor or general purpose computer, using an application specific integrated circuit (ASIC), and/or using one or more digital signal processors (DSPs).

Figure 1:
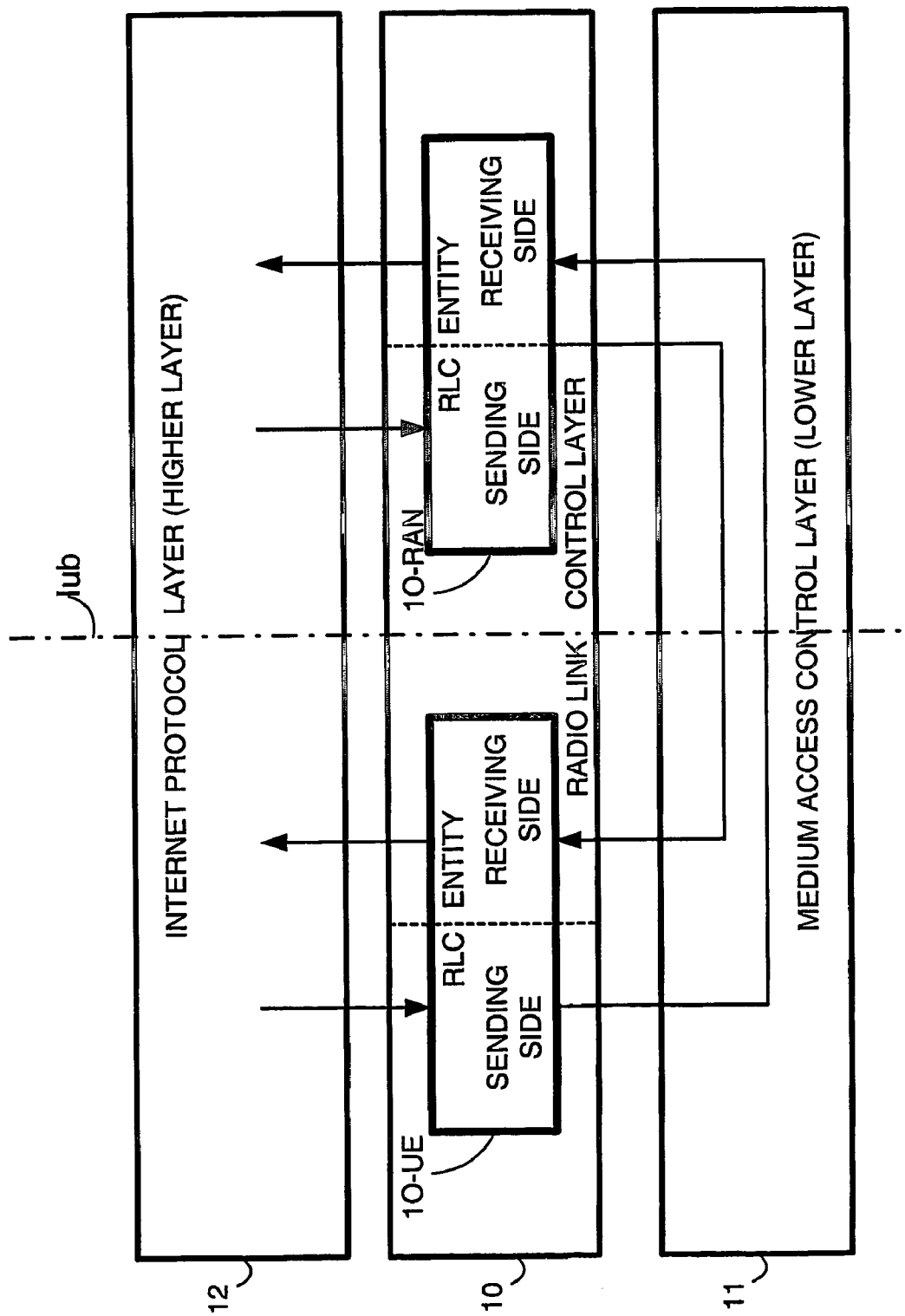
FIG. 1 is a diagrammatic view of a telecommunications layer model and particularly showing a radio link control layer with two radio link control (RLC) entities situated between a higher layer and a medium access layer (MAC).
Figure 2:
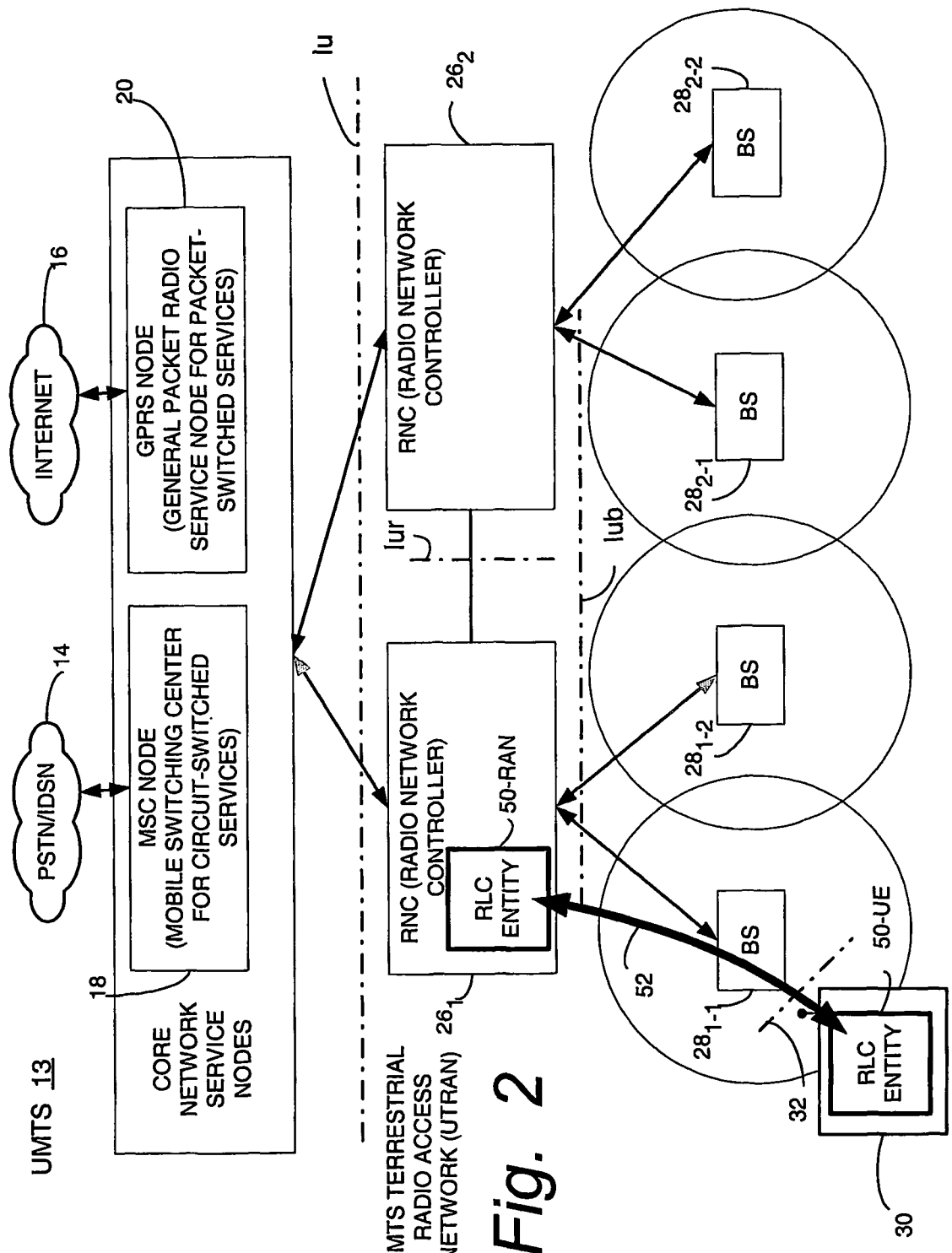
FIG. 2 is diagrammatic view of example mobile communications system in which the present invention may be advantageously employed.

An illustrative, non-limiting example of the radio access network embodiment alluded to above is now described in the context of a universal mobile telecommunications (UMTS) 13 shown in FIG. 2. A representative, connection-oriented, external core network, shown as a cloud 14 may be for example the Public Switched Telephone Network (PSTN) and/or the Integrated Services Digital Network (ISDN). A representative, connectionless-oriented external core network shown as a cloud 16, may be for example the Internet. Both core networks are coupled to their corresponding core network service nodes. The PSTN/ISDN connection-oriented network 14 is connected to a connection-oriented service node shown as a Mobile Switching Center (MSC) node 18 that provides circuit-switched services. The Internet connectionless-oriented network 16 is connected to a General Packet Radio Service (GPRS) node 20 tailored to provide packet-switched type services which is sometimes referred to as the serving GPRS service node (SGSN).

Each of the core network service nodes 18 and 20 connects to a UMTS Terrestrial Radio Access Network (UTRAN) 24 over a radio access network (RAN) interface referred to as the Iu interface. UTRAN 24 includes one or more radio network controllers (RNCs) 26. For sake of simplicity, the UTRAN 24 of FIG. 2 is shown with only two RNC nodes, particularly RNC $26_1$ and RNC $26_2$. Each RNC 26 is connected to a plurality of base stations (BS) 28. For example, and again for sake of simplicity, two base station nodes are shown connected to each RNC 26. In this regard, RNC $26_1$ serves base station $28_{1-1}$ and base station $28_{1-2}$, while RNC $26_2$ serves base station $28_{2-1}$ and base station $28_{2-2}$. It will be appreciated that a different number of base stations can be served by each RNC, and that RNCs need not serve the same number of base stations. Moreover, FIG. 2 shows that an RNC can be connected over an Iur interface to one or more other RNCs in the URAN 24. Further, it will be appreciated by those skilled in the art that base station nodes have, in some contexts, more recently become known as Node B or B-nodes.

In the illustrated embodiments, for sake of simplicity each base station 28 is shown as serving one cell. Each cell is represented by a circle which surrounds the respective base station. It will be appreciated by those skilled in the art, however, that a base station may serve for communicating across the air interface for more than one cell. For example, two cells may utilize resources situated at the same base station site.

A user equipment unit (UE), such as user equipment unit (UE) 30 shown in FIG. 2, communicates with one or more cells or one or more base stations (BS) 28 over a radio or air interface 32. Each of the radio interface 32, the Iu interface, the Iub interface, and the Iur interface are shown by dash-dotted lines in FIG. 2.

Preferably, radio access is based upon wideband, Code Division Multiple Access (WCDMA) with individual radio channels allocated using CDMA spreading codes. Of course, other access methods may be employed. WCDMA provides wide bandwidth for multimedia services and other high transmission rate demands as well as robust features like diversity handoff and RAKE receivers to ensure high quality. Each user mobile station or equipment unit (UE) 30 is assigned its own scrambling code in order for a base station 28 to identify transmissions from that particular user equipment unit (UE) as well as for the user equipment unit (UE) to identify transmissions from the base station intended for that user equipment unit (UE) from all of the other transmissions and noise present in the same area.

Figure 3:
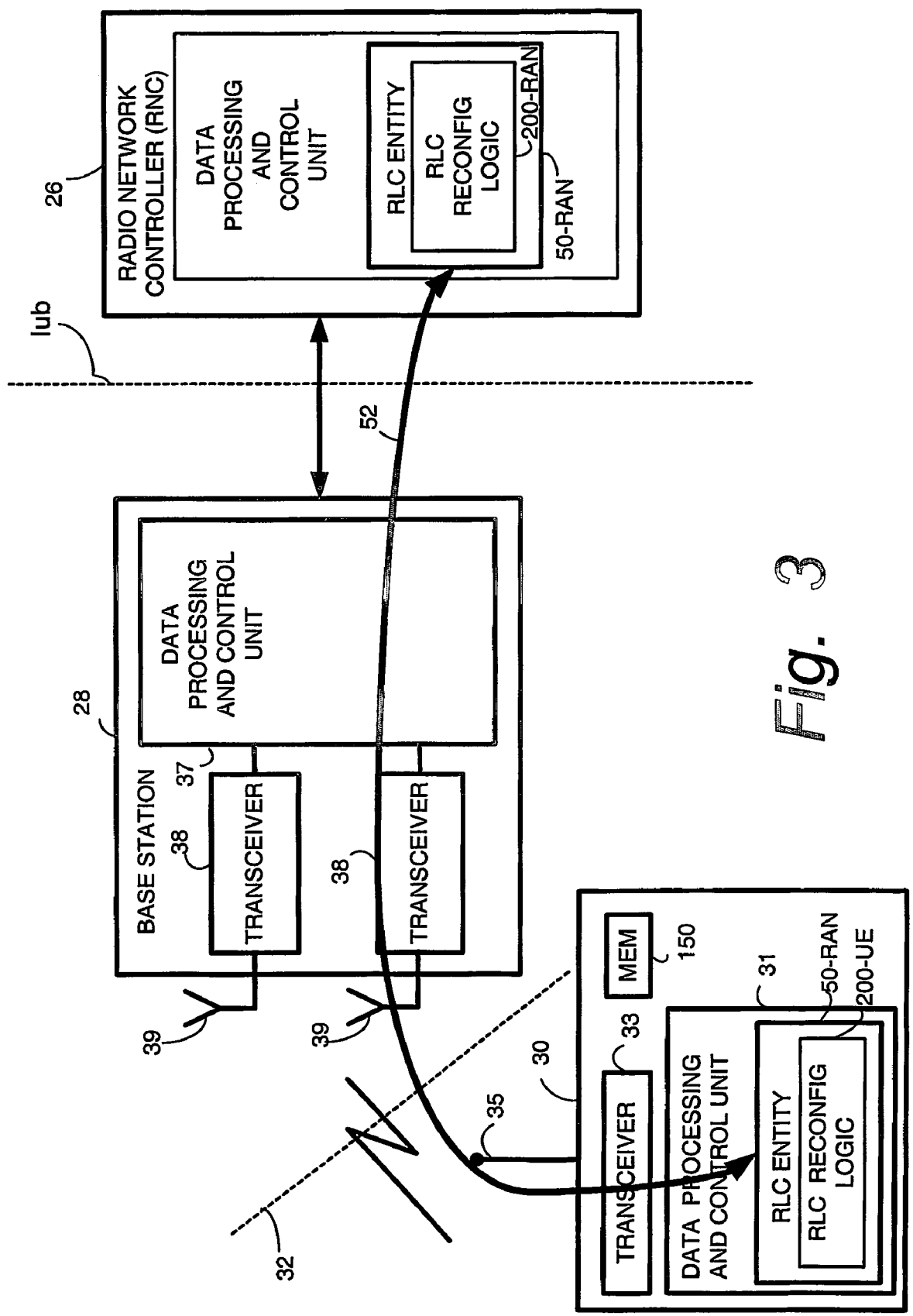
FIG. 3 is a simplified function block diagram of a portion of a UMTS Terrestrial Radio Access Network, including a user equipment unit (UE) station; a radio network controller; and a base station.

FIG. 3 shows selected general aspects of user equipment unit (UE) 30 and illustrative nodes such as radio network controller 26 and base station 28. The user equipment unit (UE) 30 shown in FIG. 3 includes a data processing and control unit 31 for controlling various operations required by the user equipment unit (UE). The UE's data processing and control unit 31 provides control signals as well as data to a radio transceiver 33 connected to an antenna 35. The radio transceiver 33 is a function of the physical layer.

The example radio network controller 26 and base station 28 as shown in FIG. 3 are radio network nodes that each include a corresponding data processing and control unit 36 and 37, respectively, for performing numerous radio and data processing operations required to conduct communications between the RNC 26 and the user equipment units (UEs) 30. Part of the equipment controlled by the base station data processing and control unit 37 includes plural radio transceivers 38 connected to one or more antennas 39.

In the example of FIG. 2 and FIG. 3, one RLC entity of an entity pair is situated in the serving radio network controller (SRNC) $26_1$ (i.e., radio link control (RLC) entity 50-RAN) while another RLC entity of the entity pair is situated in mobile station (MS) 30 (i.e., radio link control (RLC) entity 50-UE). Both the SRNC 26, being a telecommunications radio access network node, and the user equipment unit 30, are herein considered as examples of telecommunications "devices". Transmission of the RLC PDUs between radio link control (RLC) entity 50-UE and radio link control (RLC) entity 50-RAN is depicted by double-headed arrow 52 in FIG. 2 and FIG. 3.

While the radio link control (RLC) entity 50-RAN and radio link control (RLC) entity 50-UE are shown in FIG. 2 and FIG. 3 as being realized in the respective data processing and control units, it should be understood that the functionalities of radio link control (RLC) entity 50 can be provided in various ways. For example, the functions of a radio link control (RLC) entity 50 may be implemented using individual hardware circuits, using software functioning in conjunction with a suitably programmed digital microprocessor or general purpose computer, using an application specific integrated circuit (ASIC), and/or using one or more digital signal processors (DSPs).

Figure 4:
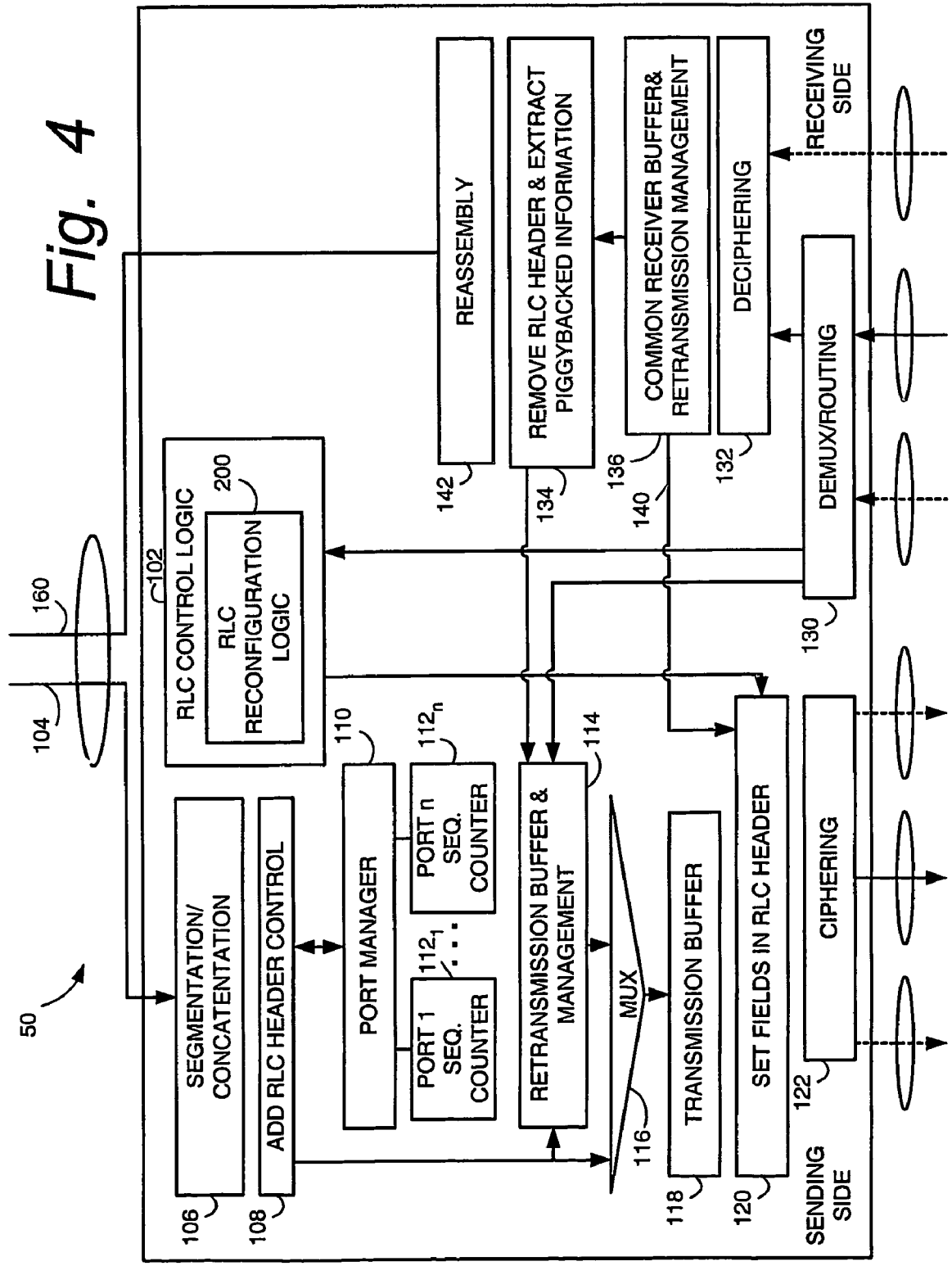
FIG. 4 is partially schematic, partially diagrammatic view of example radio link control (RLC) entity.

FIG. 4 shows functional aspects of radio link control (RLC) entity 50 for an acknowledged mode (as opposed to the unacknowledged mode or the transparent mode). As shown in FIG. 4, radio link control (RLC) entity 50 has both a sending side (which sends or transmits RLC PDUs to the lower level medium access control (MAC) layer) and a receiving side (which receives RLC PDUs from the lower level medium access control (MAC) layer). Both the sending side and the receiving side are governed and supervised by a RLC control logic 102.

Functions associated with the sending side of radio link control (RLC) entity 50 are shown on the left hand side of FIG. 4. Line 104 depicts the sending side of radio link control (RLC) entity 50 receiving service data units (SDUs) from the higher layer(s). Recall that the radio link control (RLC) entity 50 treats packets obtained from the higher layer 104 (e.g., an IP layer) as SDUs. As indicated by block 106, the SDUs are segmented and/or concatenated to form protocol data units (PDUs) of fixed length. If several SDUs fit into one PDU, those SDUs are concatenated and the appropriate length indicators are inserted into the beginning of the PDU.

As reflected by block 108, a RLC header is generated for each RLC PDU. In accordance with the present invention, radio link control (RLC) entity 50 has a port manager 110 which works in conjunction with the add RLC header control 108. After header generation for the RLC PDU, it is placed in a retransmission buffer as indicated by block 114.

The receiving side of radio link control (RLC) entity 50 receives RLC PDUs through an appropriate one(s) of the logical channels from the MAC layer. The receiving side includes a demultiplexing (DEMUX)/routing function represented by block 130. Deciphering is performed as indicated by block 132. As indicated by block 134, the RLC headers are removed and potential piggy backed status information is extracted. The PDUs are initially held in common receiver buffer 136 until a complete SDU has been received. When necessary, the control element for the common receiver buffer 136 requests retransmissions of AMD PDUs by sending negative acknowledgements to a peer radio link control (RLC) entity (by a signal depicted by line 140). After RLC PDU headers are removed at block 134, and after all segments of the SDU as carried by one or more RLC PDUs are received, the completed SDU is reassembled by reassembly block 142 and sent to the higher layer as indicated by line 160 in FIG. 4.

Thus the functions reflected by FIG. 4 are performed for each RLC entity established. As indicated above, in the case of a user equipment unit (UE) using plural radio access bearers (RABs), plural RLC entities may be established. Regardless of the number of RLC entities established, the RLC entities must all share the same memory allocation of the user equipment unit (UE). FIG. 3 illustrates UE memory 150 as being separate and distinct from data processing and control unit 31, but the memory 150 could be realized in various media and many alternative ways, including as part of data processing and control unit 31. In the case of a UE reference class 384 kbps, the UE has a memory of 50 Kbytes and affords a maximum of six AM RLC entities.

To this end, upon setup for both reception and transmission each RAB is afforded a portion or "window" in the user equipment unit (UE) memory 150, and for each. direction a certain "window size" is ascribed to the associated RAB. In fact, the user equipment unit (UE) is provided with certain RLC capability information which includes: (1) the total RLC AM buffer size; (2) maximum number of AM RLC entities; and (3) the maximum RCL AM window size. See, for example, 3GPP TS 25.322 V6.0.0 (2003-12), 3$^{rd}$ Generation Partnership Project; Technical Specification Group Radio Access Network; RLC Protocol Specification (Release 6), Section 10.3.3.34. For example, for each RLC entity the user equipment unit (UE) is provided with a parameter Configured_Tx_Window_Size which specifies the window size for its transmitting side and a parameter Configured_Rx_Window_Size which specifies the window size for its receiving side.

For sake of handling the (for example, 50K or so) portion of memory 150 of the user equipment unit (UE) allocated to the RLC entities, for each RLC entity the RLC control logic utilizes a set of "state variables". These state variables are defined in 3GPP TS 25.322 V6.0.0 (2003-12), 3$^{rd}$ Generation Partnership Project; Technical Specification Group Radio Access Network; RLC Protocol Specification (Release 6), Section 9.4. In format, the names of these state variables: (1) begin with the letter "V"; (2) have a second letter of "R" when referring to the receiving side of the RLC entity and a second letter of "T" when referring to the transmitting side of the RLC entity; and (3) have a parenthetical argument. For sake of convenience, several pertinent state variables are listed in Table 1.

TABLE 1

RLC STATE VARIABLES

| State Variable Name | Description |
|---|---|
| VT(S) | Send State Variable: Contains the "sequence number" of the next AMD PDU to be transmitted for the first time (i.e., excluding retransmitted PDUs). The VT(S) is updated, e.g., after the aforementioned AMD PDU is transmitted. |
| VT(A) | Acknowledge State Variable: Contains the "sequence number" following the "sequence number" of the last in-sequence acknowledged AMD PDU. This forms the lower edge of the transmission window of acceptable acknowledgements. |
| VT(WS) | Transmission Window Size State Variable: Contains the size that shall be used for the transmission window. The initial value of this variable is Configured_Tx_Window_Size. |
| VT(MS) | Maximum Send State Variable: Contains the "sequence number" of the first AMD PDU that can be rejected by the peer receiver, VT(MS) = VT(A) + VT(WS). This value represents the upper edge of the transmission window. VT(MS) is updated when VT(A) or VT(WS) is updated. |
| VR(R) | Receive State Variable: Contains the "sequence number" following that of the last in-sequence AMD PDU received. It is updated upon receipt of the AMD PDU with "sequence number" equal to VR(R). |
| VR(H) | Highest Expected State Variable: Contains the "sequence number" following the highest "sequence number" of any received AMD PDU. When an AMD PDU is received with "sequence number" x such that VR(H) ≦ x < VR(MR), VR(H) shall be set equal to x + 1. |
| VR(MR) | Maximum Acceptable Receive Sate Variable: Contains the "sequence number" of the first AMD PDU that shall be rejected by the receiver, i.e., VR(MR) = VR(R) + Configured_Rx_Window_Size. |
| VR(US) | Receiver Send Sequence State Variable: Contains the "sequence number" following that of the last UMD PDU received. |

Figure 5:
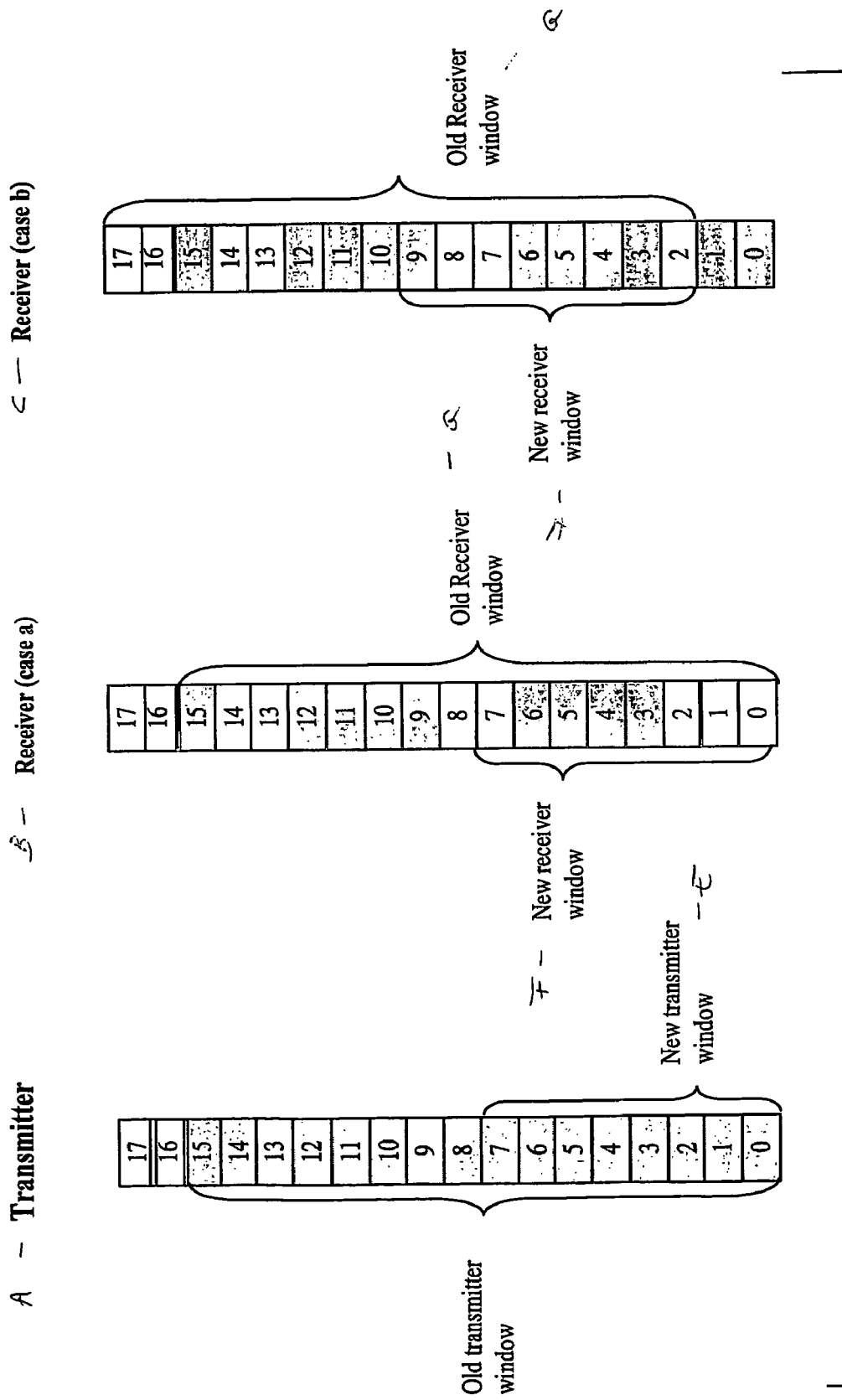
FIG. 5 is a diagrammatic view illustrating RLC window size reconfiguration for a transmitter and two cases of RLC window size reconfiguration for a receiver.

As mentioned above, current standards ostensibly permit the window size for a RLC entity to be reconfigured, but do not address certain problems which could occur during window size configuration. In FIG. 5 an example of a RLC window size reconfiguration is shown where the window size is reduced from sixteen to eight. FIG. 5 shows the RLC window size being reduced in a transmitter side of a RLC entity, as well as two cases (case a and case b) of RLC window size reduction in a receiver side of a corresponding peer RLC entity. In FIG. 5, the shaded blocks correspond to PDUs which are actually transmitted (in the case of the transmitter) or received (in the case of the receiver), while the unshaded blocks correspond to PDUs which are not yet transmitted (in the case of the transmitter) or not yet received (in the case of the receiver).

In case (a) of FIG. 5, the transmitter and receiver windows cover the same sequence number range. By contrast, in case (b) of FIG. 5 the receiver window is advanced further than the transmitter window due to the fact that a status message acknowledging PDUs 0 and 1 has not yet been sent, or has been sent but lost over the air interface.

As illustrated in FIG. 3 and FIG. 4, the RLC entities 50 and especially the UE RLC entity 50-UE are advantageously provided with RLC reconfiguration logic 200 which provides constructive and practical ways of reconfiguring the RLC window size during an RLC reconfiguration operation. By virtue of RLC reconfiguration logic 200, the radio link control entity(ies) 50 is/are arranged, when so requested during a RLC reconfiguration procedure, to reconfigure at least one of (1) a size of a transmitter buffer window to form a new transmitter buffer window having a transmitter buffer window size smaller than an old transmitter buffer window; and (2) a size of a receiver buffer window to form a new receiver buffer window having a receiver buffer window size smaller than an old receiver buffer window. The RLC reconfiguration logic 200 may essentially simultaneously implement reconfiguration of the size of the transmitter buffer window and the size of the receiver buffer window, or may implement these two reconfigurations at different times.

The RLC reconfiguration logic 200 may be implemented as a part of RLC control logic 102 in the manner shown in FIG. 3 and FIG. 4, with RLC control logic 102 being either part of or distinct from the data processing and control unit. For example, the RLC reconfiguration logic 200 can comprise a set of instructions and/or data which is executed by one or more processors comprising the data processing and control unit. Alternatively, RLC reconfiguration logic 200 may be implemented separately as, e.g., a separate processor, circuit, controller, or state machine, for example.

First Example Embodiment/Mode for UE

In a first example embodiment and mode of operation, the radio link control (RLC) entity 50-UE through its RLC reconfiguration logic 200-UE: (A) discards any downlink RLC protocol data units (PDUs) which were received as being within the old receiver buffer window but which are outside the new receiver buffer window; and (B) retains in the radio link control (RLC) buffer memory any uplink RLC protocol data units (PDUs) whose receipt by the radio access network has not been positively acknowledged.

Rationale for the first embodiment/mode is based on considerations of effects in reducing the window both on the receiver side and the transmitter side. Concerning reduction of the receiver window, when the receiver window is reduced, some of the PDUs received in the old receiver window may end up being outside the new receiver window. In order to free memory in the first embodiment these PDUs are discarded in the UE and treated as not being received. This implies that UTRAN needs to retransmit these PDUs after the reconfiguration but this is considered to have little impact on the performance.

Concerning reduction of the transmitter window, when the transmitter window is decreased, some of the PDUs transmitted in the old transmitter window may end up being outside the new transmitter window. Flippant discard of these PDUs from the transmitter in order to free memory can result in undesirable consequences.

A first such consequence on the transmitter side of the RLC entity is permanent data loss. If these PDUs are discarded, they can not be retransmitted, which would lead to a permanent data loss. This could potentially be acceptable for radio bearers (RBs) but would mean that it is not possible to reduce the window size for signalling radio bearers (SRBs). A radio bearer (RB) is used for user data and an signalling radio bearer (SRB) is used for control data. As discussed in relation to the default configurations used at handover from GSM it would be beneficial to be able to reduce the window size from the value 128 used in the default configuration to a lower value to free memory.

A second such consequence on the transmitter side is potential errors in protocol operation. The discarding of PDUs in the transmitter side may lead to protocol errors. Consider case (b) in FIG. 5 above. If the transmitter would discard PDUs outside the new transmitter window it means that PDUs 8-15 are discarded and can not be retransmitted. However, due to that the receiver window in case (b) is advanced further than the transmitter window, a PDU with SN=8 is within the new receiver window. If this PDU can not be retransmitted the RLC protocol has stalled.

Therefore, in the first embodiment all PDUs that are not positively acknowledged are kept in the buffer. This implies that if UTRAN negatively lo acknowledges some of the PDUs 8-15 in the example after the reconfiguration, the UE must be prepared to retransmit the PDUs.

Figure 6:
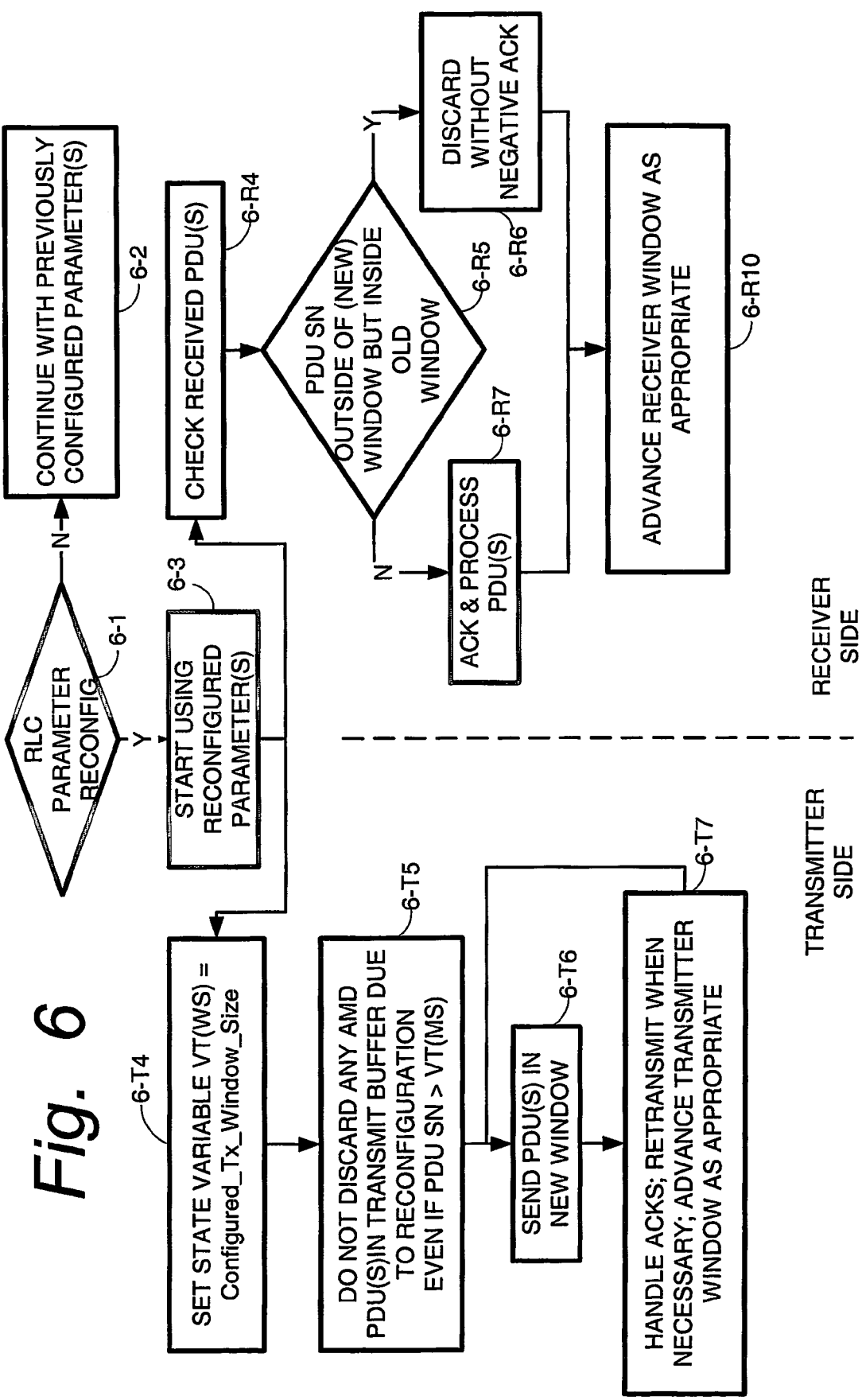
FIG. 6 is a flowchart depicting selected, basic, representative actions performed by a UE RLC entity in accordance with a first embodiment and first mode during a RLC reconfiguration operation.

In view of the foregoing, FIG. 6 illustrates selected, basic, representative actions performed by a RLC entity 50-UE, and RLC reconfiguration logic 200-UE in particular, in accordance with the first embodiment and first mode during a RLC reconfiguration operation. FIG. 6 shows actions performed both on a transmitter side and a receiver side of the UE RLC entity 50-UE.

Action 6-1 shows the UE RLC entity 50-UE checking to determine whether it has received any indication that a RLC reconfiguration operation is necessary. For user equipment unit 30, such indication can be provided, for example, by a message received from the radio access network. If no such indication has been received, UE RLC entity 50-UE continues to operate with the previously configured RLC parameters (as reflected by action 6-2). But if an indication has been received that an RLC reconfiguration operation is to be performed, as shown by action 6-3 both the receiver side and the transmitter side of UE RLC entity 50-UE begin to utilize the reconfigured parameters.

It is assumed in the RLC reconfiguration operation of FIG. 6 and of the other embodiments and modes described herein that the RLC reconfiguration operation involves reconfiguration of the transmitter buffer window (e.g., to form a new transmitter buffer window having a transmitter buffer window size smaller than an old transmitter buffer window) and of the receiver buffer window (e.g., to form a new receiver buffer window having a receiver buffer window size smaller than an old receiver buffer window).

On the receiver side, as action 6-R4 the RLC reconfiguration logic 200-UE checks the received RLC protocol data units (PDUs), e.g. checks the sequence numbers or other sequence/order identifiers of the received RLC protocol data units (PDUs). As action 6-R5 the RLC reconfiguration logic 200-UE determines whether the serial numbers of any RLC protocol data units (PDUs) which have thus far been received are outside of the new receiver buffer window but yet outside of the old receiver buffer window. If the determination of action 6-R5 is affirmative with respect to any already-received PDU, that/those PDU(s) is/are discarded as action 6-R6 without a negative acknowledgement. The received PDUs which are inside the new receiver buffer window are acknowledged as necessary and processed as action 6-R7. After either the discard of action 6-R6 or the processing of action 6-R7, as action 6-R10 the receiver window is advanced as appropriate. Such advancing at action 6-R10 can involve, e.g., the updating of the state variables VR(MR) and VR(H). In accordance with the advancement of the receiver buffer window, the receiver continues to process RLC protocol data units (PDUs) as they are received, to acknowledge and process the received RLC protocol data units (PDUs), and further advance the receiver buffer window until the transmission is completed.

On the transmitter side, upon reconfiguration as action 6-T4 the state variable VT(WS) is set to the value of Configured_Tx_Window_Size which has been provided to the UE RLC entity 50-UE. As action 6-T5, the RLC reconfiguration logic 200 requires that the transmitter side not discard any PDU(s) in the receiver buffer due to the RLC reconfiguration operation, even if the sequence or serial number of the PDU is greater than VT(MS). It will be recalled that VT(MS) is the Maximum Send State Variable and, as such, contains the "sequence number" of the first AMD PDU that can be rejected by the peer receiver, VT(MS)=VT(A)+VT(WS), and thus represents the upper edge of the transmission window. Then, as action 6-T6, the transmitter side sends to the receiver of the peer entity the RLC protocol data units (PDUs) in the new transmitter buffer window. As action 6-T7 the transmitter side handles the acknowledgements received from the peer receiver entity; retransmits PDUs when necessary in accordance with the acknowledgements so handled; and advances the transmitter buffer window as appropriate.

It is possible that, as a result of the RLC reconfiguration operation of FIG. 6, the RLC buffer memory required for the reconfigured RLC entity momentarily can be as high as the old RLC window indicates. This could potentially mean that there is not enough free memory to segment all incoming SDUs for all RLC entities. In such case the RLC reconfiguration operation of FIG. 6A can be utilized as a variation of the RLC reconfiguration operation of FIG. 6. In the RLC reconfiguration operation of FIG. 6A, if and when the memory capability (e.g., UE memory 150) of the user equipment unit (UE) is exceeded, the user equipment unit (UE) does not need to segment SDUs received from upper layers. By not requiring segmentation of SDUs received from upper layers, the memory required for all transmitter buffers in the UE will not require more memory than needed to support the configured RLC windows at any time.

Figure 6A:
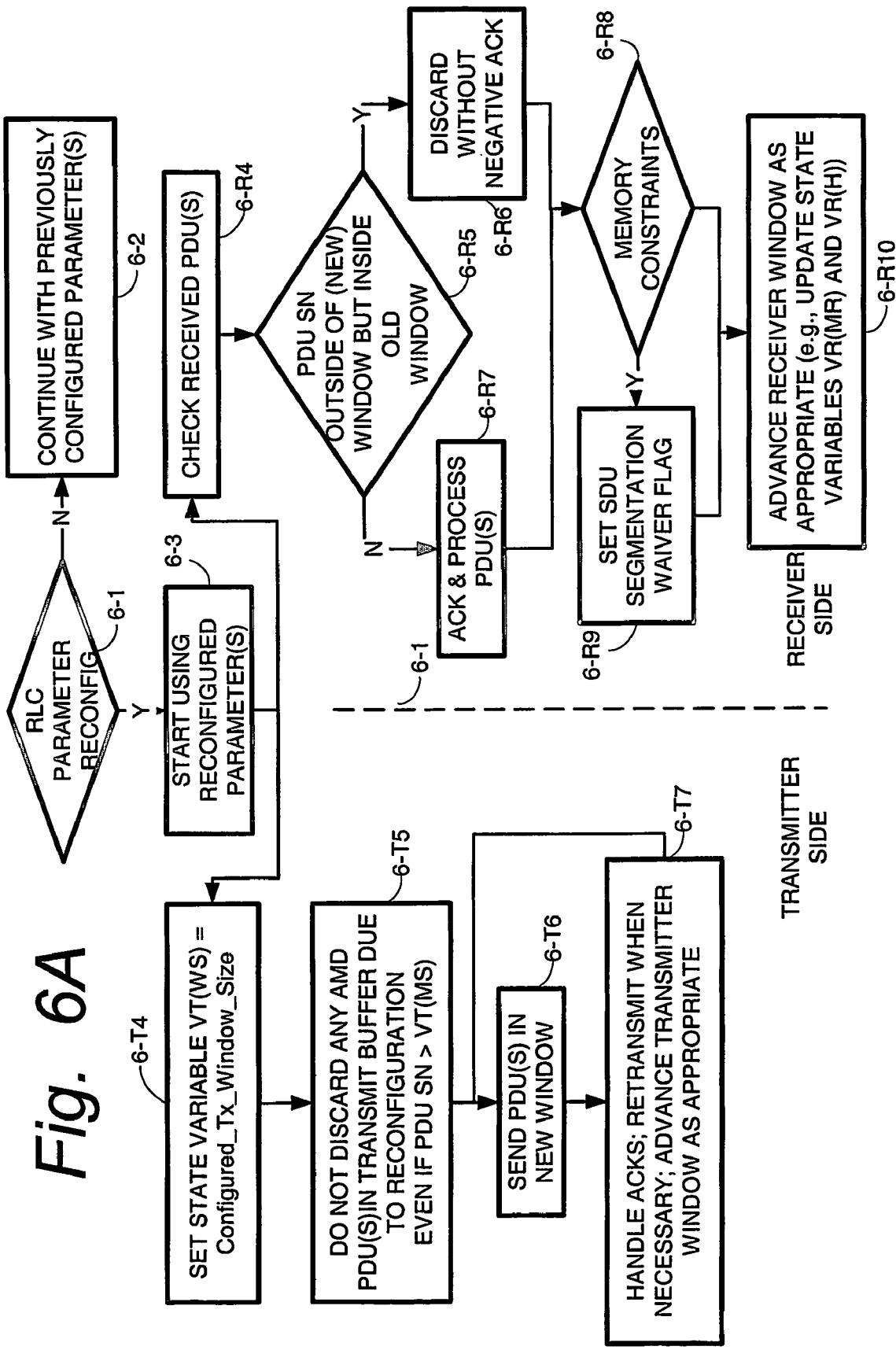
FIG. 6A is a flowchart depicting selected, basic, representative actions performed by a UE RLC entity during a variation of the RLC reconfiguration operation of FIG. 6.

The basic actions of the RLC reconfiguration operation FIG. 6A which are similar to those of the RLC reconfiguration operation of FIG. 6 are similarly numbered. The RLC reconfiguration operation of FIG. 6A essentially differs from the RLC reconfiguration operation of FIG. 6 by checking as action 6-R8 whether there are any memory constraints caused by the RLC reconfiguration operation. If memory constraints do exist, then as action 6-R9 the RLC reconfiguration logic 200 sets a SDU segmentation waiver flag so that subsequently RLC control logic 102 will know that it is not required to perform segmentation of SDUs received from the higher layers. Although not shown in FIG. 6A, when the memory constraint is alleviated the SDU segmentation waiver flag can be cleared to permit continuation of the SDU segmentation.

The interaction between RLC and higher layers when data can not be transmitted (e.g. due to that the RLC window is full or the RLC entity is suspended) is not specified herein, it being understood that some form of flow control must exist also in, e.g., existing 3GPP TS UE implementations, to prohibit a higher layer application from submitting further data to the RLC in these situations.

The first embodiment and first mode are generally very advantageous, but might not work well if the in-sequence delivery is not configured. If, for example, an SDU is present in PDUs 11-12 in case (b) of FIG. 5, this SDU may already be delivered to higher layer when the reduction of the RLC window size occurs. After the reconfiguration these PDUs will be retransmitted by the peer entity and consequently a duplicate of the SDU will be delivered to higher layers. The retransmission of PDUs with sequence numbers outside the old transmitter window also cause additional delay. A second embodiment and second mode, described below, address this and other considerations.

Second Example Embodiment/Mode for UE

In some regards a second example embodiment and mode of operation is more sophisticated than the first embodiment/mode. In the second example embodiment and mode of operation, the radio link control (RLC) entity through its RLC reconfiguration logic 200-UE: (A) retains all downlink RLC protocol data units (PDUs) stored in the receiver buffer, even if outside the new receiver buffer window until the receiver buffer window can be advanced; and (B) retains all uplink RLC protocol data units (PDUs) stored in the transmitter buffer even if outside the new transmitter buffer window.

Figure 7:
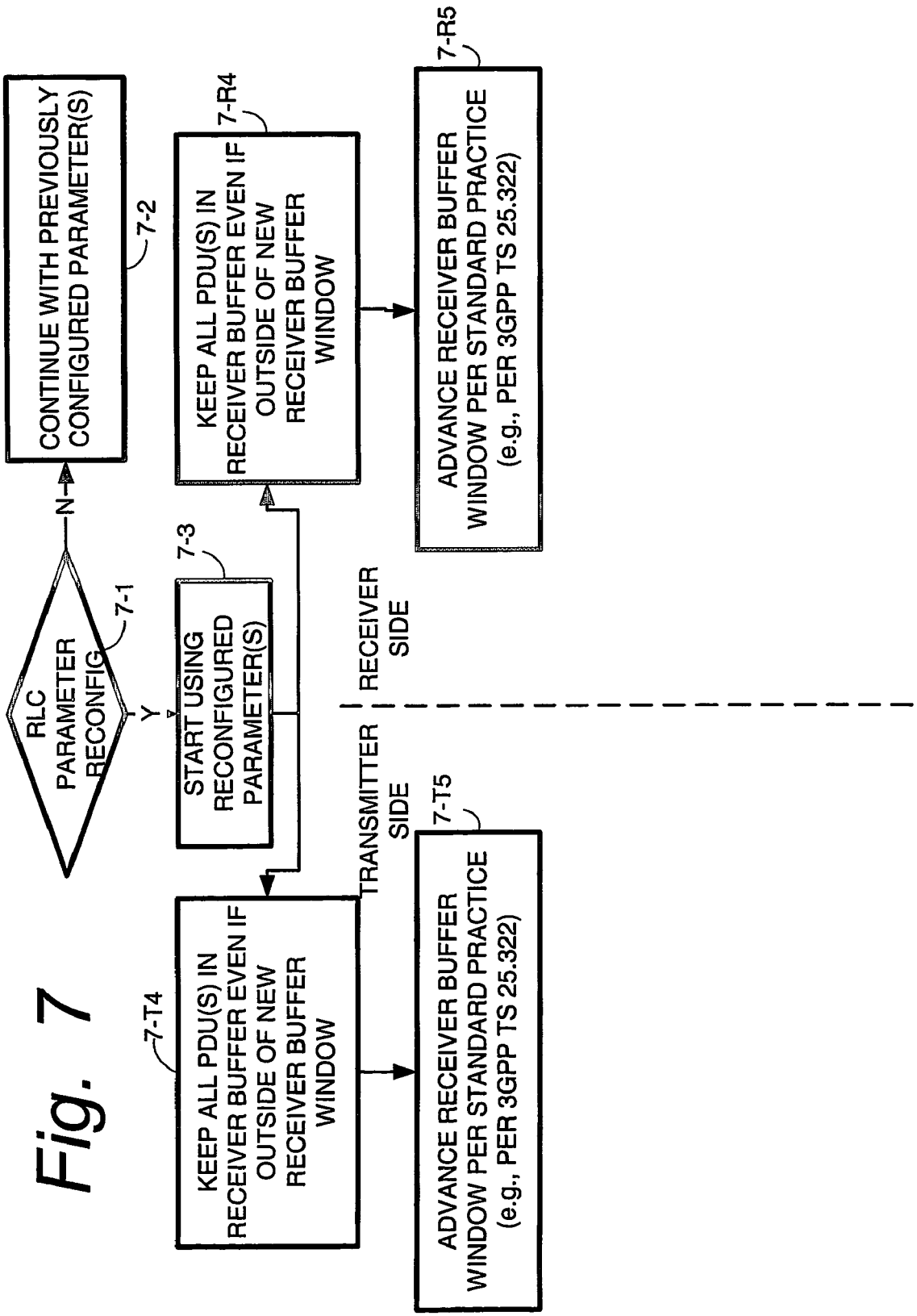
FIG. 7 is a flowchart depicting selected, basic, representative actions performed by a UE RLC entity in accordance with a second embodiment and second mode during a RLC reconfiguration operation.

In view of the foregoing, FIG. 7 illustrates selected, basic, representative actions performed by a RLC entity 50, and RLC reconfiguration logic 200-UE in particular, in accordance with the second embodiment and second mode during a RLC reconfiguration operation. In similar manner as with the preceding RLC reconfiguration operation of FIG. 6, as action 7-1 the UE RLC entity 50-UE checks to determine whether it has received any indication that a RLC reconfiguration operation is necessary. If no such indication has been received, UE RLC entity 50-UE continues to operate with the previously configured RLC parameters (as reflected by action 7-2). But if an indication has been received that an RLC reconfiguration operation is to be performed, as shown by action 7-3 both the receiver side and the transmitter side of UE RLC entity 50-UE begin to utilize the reconfigured parameters.

In the second embodiment/mode, when the receiver window is reduced (e.g., as part of a RLC reconfiguration operation), all PDUs in the receiver buffer are kept, even if these PDUs are outside the new receiver window (action 7-R4). As action 7-R5, the receiver buffer window is advanced according to the normal rules (e.g., those described in 3GPP TS 25.322, for example).

Similarly, the second embodiment/mode addresses reduction of the transmitter window size. Specifically, when the transmitter window is reduced, all PDUs in the transmitter buffer are kept, even if these PDUs are outside the new transmitter window (action 7-T4). As action 7-T5 the transmitter window is advanced according to the normal rules (e.g., those described in 3GPP TS 25.322, for example).

Since all PDUs are kept in the RLC buffers at reconfiguration in accordance with this second embodiment/mode, it is possible that PDUs transmitted and/or received on the new RAB may temporarily cause the capacity or capability of the UE RLC buffer 150 capability to be exceeded. Accordingly, the RLC reconfiguration operation of FIG. 7A is a variation of the RLC reconfiguration operation of FIG. 7 and can be alternatively implemented to handle the possibility that the UE buffer memory may not be sufficient to handle all AMD PDUs during an initial time after the reconfiguration.

As described in example fashion below, the RLC reconfiguration operation of FIG. 7A optionally performs a check for capacity strain for the radio link control (RLC) buffer memory. In case of capacity strain, the RLC entity can optionally perform protective measures.

Figure 7A:
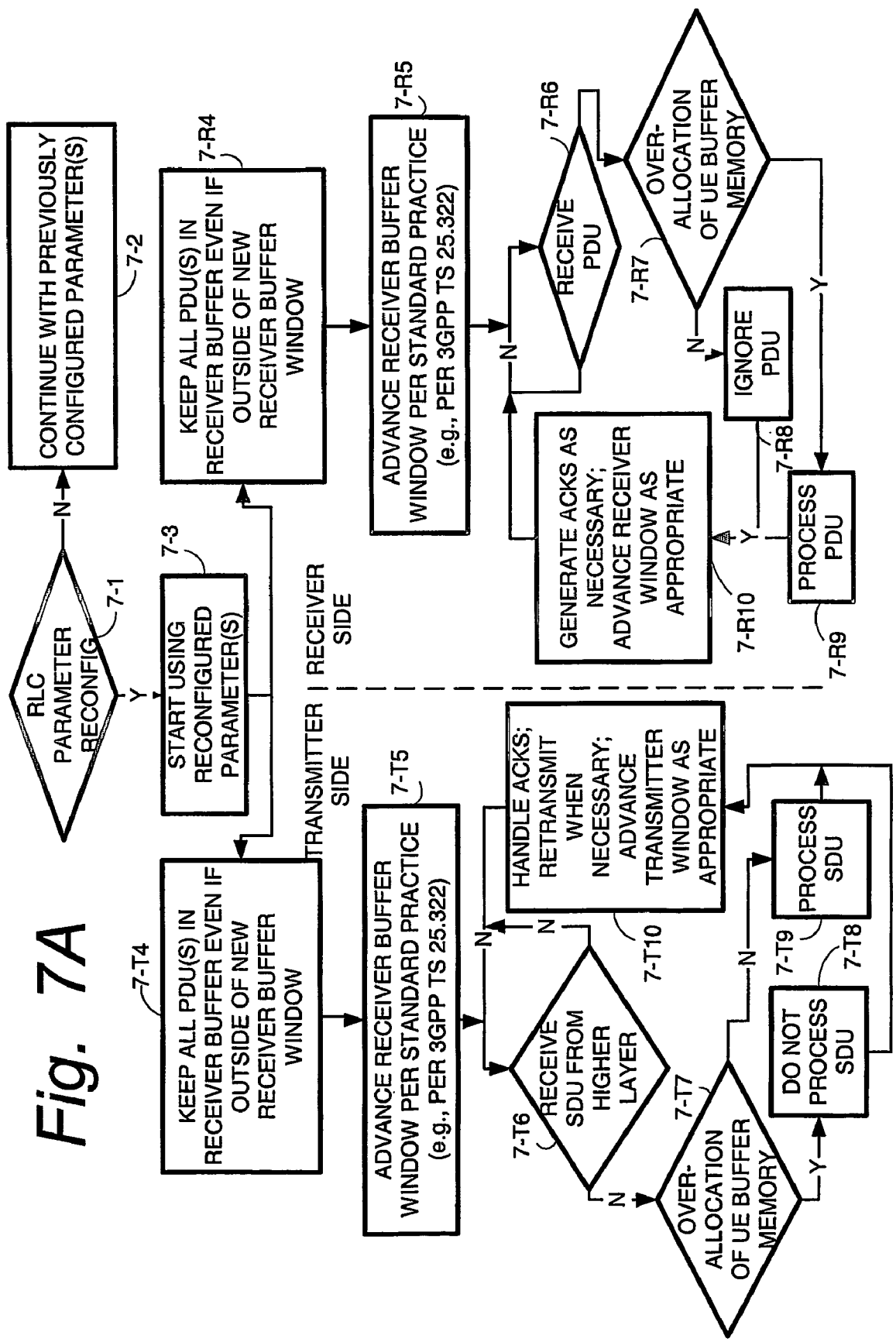
FIG. 7A is a flowchart depicting selected, basic, representative actions performed by a UE RLC entity during a variation of the RLC reconfiguration operation of FIG. 7.

Many of the actions of the RLC reconfiguration operation of FIG. 7A are common to those of the RLC reconfiguration operation of FIG. 7, and therefore are not discussed again. The RLC reconfiguration operation of FIG. 7A basically differs from the RLC reconfiguration operation of FIG. 7 by checking, before a SDU received from upper layers is processed or a received AMD PDU is stored, whether the RLC buffer memory is sufficient to store certain PDUs.

As a first example memory capacity check, the radio link control entity can check whether receipt of a Service Data Unit (SDU) from a high layer would exceed capacity of the radio link control (RLC) buffer memory and (if so) decide not to process the SDU. On the transmitter side the RLC reconfiguration operation of FIG. 7A basically differs from the RLC reconfiguration operation of FIG. 7 by including further action 7-T6, action 7-T7, action 7-T8, action 7-T9, and action 7-T10. The action 7-T6 shows the transmitter side receiving a SDU from higher layer(s), which is followed at action 7-T7 by the RLC reconfiguration logic 200 checking whether storage of the SDU(s) received as action 7-T6 would cause an over-allocation in UE memory 150.

In particular, as action 7-T7 the RLC reconfiguration logic 200 checks whether the RLC buffer memory is sufficient to process AMD PDUs with SN in the interval [VT(A)<SN<VT(S)] for all RLC AM entities. In this first example capacity memory check, SN is the sequence number of the PDU; VT(A) is a sequence number following the last in-sequence acknowledged AMD PDU; and VT(S) is a sequence number for a next AMD PDU to be transmitted for a first time.

If it is determined at action 7-T7 that the processing of a SDU received from upper layer leads to over-allocation of the UE buffer memory according to the signalled UE capability, the SDU is not processed (as reflected by action 7-T8). Otherwise, the SDU contemplated at action 7-T6 is processed as action 7-T9. Then, after either action 7-T8 or action 7-T9, as action 7-10 the transmitter side performs such routine matters as handling any acknowledgements which may be appropriate at this time; retransmitting PDUs to its peer RLC entity (e.g., in the RAN); and advancing the transmitter buffer window as appropriate.

The RLC reconfiguration operation of FIG. 7A provides a mechanism whereby UE always can receive AMD PDUs with SN in the interval [VR(R)<SN<VR(H)] for all RLC AM entities (i.e. retransmissions), which is needed to prevent potential deadlock situations. If this is not guaranteed it is possible that the UE ignores all received PDUs and it is not possible to get out of a stall situation.

As a second example capacity memory check of the RLC reconfiguration operation of FIG. 7A, the radio link control entity can check whether receipt of a Protocol Data Unit (PDU) from the radio access network would exceed capacity of the radio link control (RLC) buffer memory and (if so) decide to ignore the PDU. This is primarily accomplished on the receiver side, where the RLC reconfiguration operation of FIG. 7A basically differs from the RLC reconfiguration operation of FIG. 7 by including further action 7-R6, action 7-R7, action 7-R8, action 7-R9, and action 7-R10. The action 7-R6 shows the receiver side receiving the PDU. As action 7-R7 the RLC reconfiguration logic 200 of the FIG. 7A embodiment checks whether storage of the PDU(s) received as action 7-R6 would cause an over-allocation in UE memory 150.

In particular, as action 7-R7 the RLC reconfiguration logic 200 checks whether the RLC buffer memory is sufficient to store AMD PDUs which have a sequence number (SN) in the interval [VR(R)<SN<VR(H)] for all RLC AM entities. In this capacity memory check, SN is the sequence number of the PDU; VR(R) is a sequence number following the last in-sequence AMD PDU received; and VR(H) is a sequence number following a highest sequence number of any received AMD PDU If the buffer memory as checked as action 7-R7 is not sufficient, those PDUs are ignored as action 7-R8 (without generating any acknowledgements). (The check of action 7-R8 only needs to be performed if the SN of the received PDU causes VR(H) to be increased).

Otherwise, if action 7-R8 is not performed, as action 7-R9 the received RLC protocol data units (PDUs) are processed. Then, subsequent to action 7-R9 or action 7-R8, as action 7-R10 the receiver side generates any necessary acknowledgements (if only for other PDUs), and advances the receiver buffer window as appropriate.

Thus, for a user equipment unit, two embodiments/modes for handling the reduction of the configured RLC window size have been described above. The first embodiment/mode is straightforward but only works if the in-sequence delivery is configured. The first embodiment/mode also requires that the PDUs outside the new RLC window are retransmitted after the reconfiguration which implies a larger delay for the user data. The second embodiment/mode requires more advanced memory handling but handles also the case where in-sequence delivery is not configured and avoids retransmissions of PDUs after the reconfiguration.

Example Embodiment for Network Node

Figure 8:
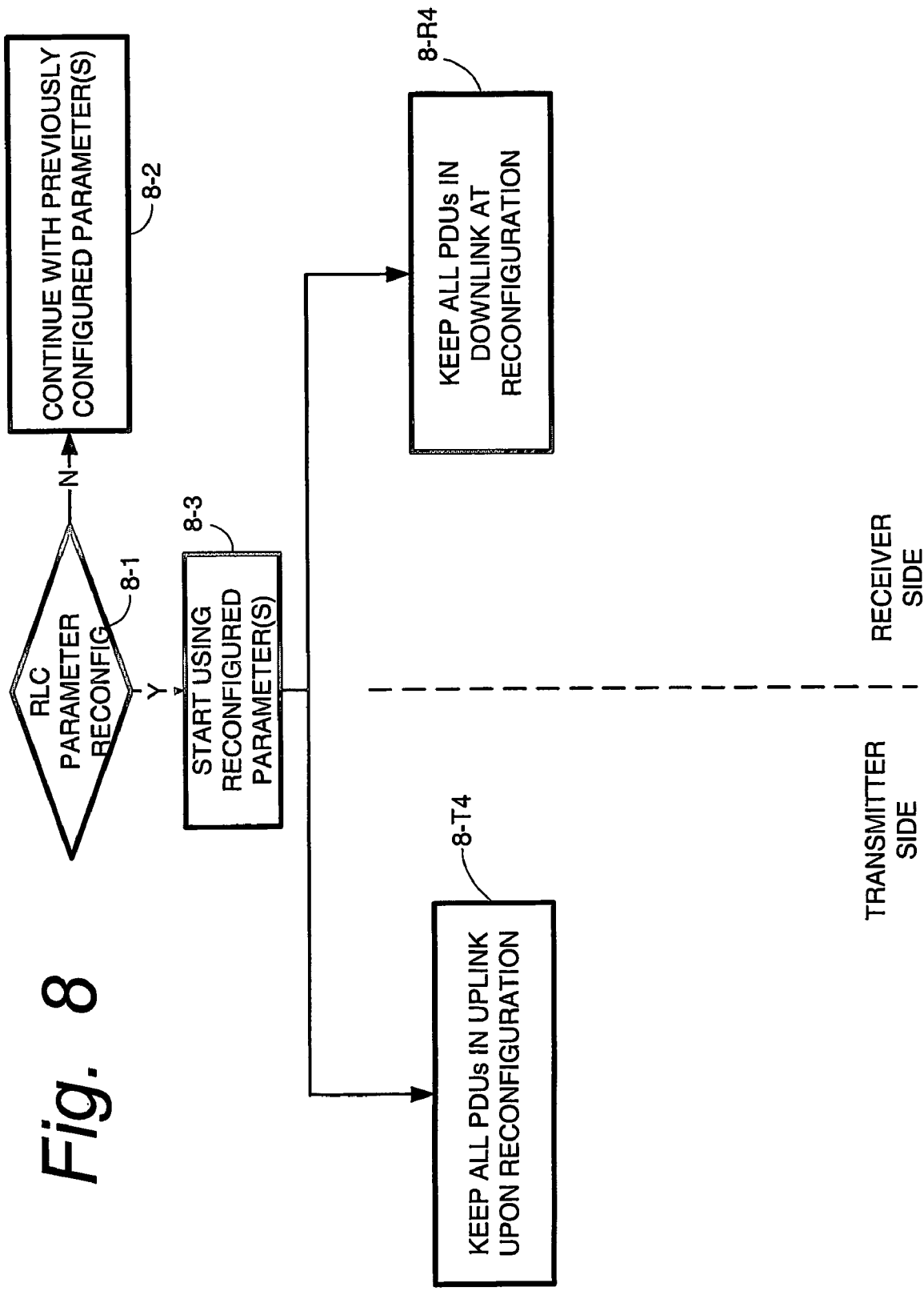
FIG. 8 is a flowchart depicting selected, basic, representative actions performed by a network node (RAN) RLC entity in accordance during a RLC reconfiguration operation.

For a network node, FIG. 8 illustrates selected, basic, representative actions performed by a RLC entity 50-RAN, and RLC reconfiguration logic 200-RAN in particular, in accordance during a RLC reconfiguration operation. FIG. 8 shows actions performed both on a transmitter side and a receiver side of the RLC entity 50-RAN.

Action 8-1 shows the RLC entity 50-RAN checking to determine whether it has received any indication that a RLC reconfiguration operation is necessary. If no such indication has been received, RLC entity 50-RAN continues to operate with the previously configured RLC parameters (as reflected by action 8-2). But if an indication has been received that an RLC reconfiguration operation is to be performed, as shown by action 8-3 both the receiver side and the transmitter side of RLC entity 50-RAN begin to utilize the reconfigured parameters.

It is assumed in the RLC reconfiguration operation of FIG. 8 and of the other embodiments and modes described herein that the RLC reconfiguration operation involves reconfiguration of the transmitter buffer window.(e.g., to form a new transmitter buffer window having a transmitter buffer window size smaller than an old transmitter buffer window) and of the receiver buffer window (e.g., to form a new receiver buffer window having a receiver buffer window size smaller than an old receiver buffer window). As indicated previously, the reconfiguration of the receiver buffer window and transmitter buffer window can be either performed at the same time, or at separate times. In either event, the illustration of FIG. 8 is illustrative.

On the receiver side, as action 8-R4 the RLC reconfiguration logic 200-RAN keeps all PDUs in the downlink at the reconfiguration. Similarly, on the transmitter side, upon reconfiguration as action 8-T4 all PDUs in the uplink are also kept since the user equipment unit 30 may or may not discard uplink data upon reconfiguration.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A telecommunications device comprising:
   a transceiver which enables the device to communicate over an air interface;
   a radio link control (RLC) entity which forms uplink RLC protocol data units (PDUs) for transmission over the air interface and which receives downlink RLC protocol data units (PDUs) over the air interface;
   a radio link control (RLC) buffer memory configured to include a transmitter buffer for storing the uplink RLC protocol data units (PDUs) and a receiver buffer for storing the downlink RLC protocol data units (PDUs); and
   characterized by:
   RLC reconfiguration logic means which is arranged to reconfigure at least one of a size of a transmitter buffer window and a size of a receiver buffer window by implementing a strategy for handling at least one of (a) downlink RLC protocol data units (PDUs) which are outside a new receiver buffer window; and (2) uplink RLC protocol data units (PDUs) which are either outside a new transmitter window or whose receipt by the radio access network has not been positively acknowledged.

2. The apparatus of claim 1, wherein the telecommunications device is a user equipment unit, and wherein the RLC reconfiguration logic means is operative to:
   (A) discard any downlink RLC protocol data units (PDUs) which were received as being within old receiver buffer window but which are outside the new receiver buffer window; and,
   (B) retain in the radio link control (RLC) buffer memory (150) any uplink RLC protocol data units (PDUs) whose receipt by the radio access network has not been positively acknowledged.

3. The apparatus of claim 2, wherein the radio link control entity is further arranged to retransmit after the reconfiguration the uplink RLC protocol data units (PDUs) which were negatively acknowledged by the radio access network.

4. The apparatus of claim 2, wherein the radio link control entity is further arranged not to require segmentation of a service data unit (SDU) received from a higher layer when, after the reconfiguration, the radio link control (RLC) buffer memory experiences a memory size constraint.

5. The apparatus of claim 2, wherein the radio link control entity does not negatively acknowledge the downlink RLC protocol data units (PDUs) that were received in the old receiver buffer window but which are outside the new receiver buffer window.

6. The apparatus of claim 1, wherein the telecommunications device is a user equipment unit, and wherein the RLC reconfiguration logic means is operative to:
   (A) retain all downlink RLC protocol data units (PDUs) stored in the receiver buffer even if outside the new receiver buffer window until the receiver buffer window can be advanced; and,
   (B) retain any uplink RLC protocol data units (PDUs) stored in the transmitter buffer, whose receipt by the radio access network has not been positively acknowledged, even if outside the new transmitter buffer window.

7. The apparatus of claim 6, wherein the radio link control entity is further arranged to check whether receipt of a Protocol Data Unit (PDU) from the radio access network would exceed capacity of the radio link control (RLC) buffer memory.

8. The apparatus of claim 7, wherein the radio link control entity is further arranged to check for acknowledge mode RLC entities whether the buffer memory is sufficient to store acknowledge mode RLC protocol data units (AMD PDUs) having a sequence number SN which satisfies VR(R) <SN<VR(H), wherein VR(R) is a sequence number following the last in-sequence AMD PDU received; and VR(H) is a sequence number following a highest sequence number of any received AMD PDU.

9. The apparatus of claim 6, wherein the radio link control entity is further arranged to check whether receipt of a Service Data Unit (SDU) from a high layer would exceed capacity of the radio link control (RLC) buffer memory.

10. The apparatus of claim 9, wherein the radio link control entity is further arranged to check for acknowledge mode RLC entities whether the buffer memory is sufficient to store acknowledge mode RLC protocol data units (AMD PDUs) having a sequence number SN which satisfies VT(A) <SN<VT(S), wherein VT(A) is a sequence number following the last in-sequence acknowledged AMD PDU; and VT(S) is a sequence number for a next AMD PDU to be transmitted for a first time.

11. The apparatus of claim 1, wherein the telecommunications device is a radio access network node, and wherein the RLC reconfiguration logic means is operative to:
    (A) retain all downlink RLC protocol data units (PDUs) upon reconfiguration; and,
    (B) retain all uplink RLC protocol data units (PDUs) upon reconfiguration.

12. A method of operating a user equipment unit which communicates over an air interface with a radio access network, the method comprising the steps of:
    using a radio link control entity to form uplink RLC protocol data units (PDUs) for transmission over the air interface and to receive downlink RLC protocol data units (PDUs) over the air interface;
    storing the uplink RLC protocol data units (PDUs) in a transmitter buffer of a radio link control (RLC) buffer memory;
    storing the downlink RLC protocol data units (PDUs) in a receiver buffer of the radio link control (RLC) buffer memory;
    during a RLC reconfiguration wherein the user equipment unit is directed to reconfigure at least one of (a) a size of a transmitter buffer window to form a new transmitter buffer window having a transmitter buffer window size smaller than an old transmitter buffer window; and (b) a size of a receiver buffer window to form a new receiver buffer window having a receiver buffer window size smaller than an old receiver buffer window;
    discarding any downlink RLC protocol data units (PDUs) that were received as being within the old receiver buffer window but which are outside the new receiver buffer window; and,
    retaining in the radio link control (RLC) buffer memory any uplink RLC protocol data units (PDUs) whose receipt by the radio access network has not been positively acknowledged.

13. The method of claim 12, comprising the step of the radio link control entity retransmitting after the reconfiguration the uplink RLC protocol data units (PDUs) which were negatively acknowledged by the radio access network.

14. The method of claim 12, further comprising the radio link control entity not requiring segmentation of a service data unit (SDU) received from a higher layer when, after the reconfiguration, the radio link control (RLC) buffer memory experiences a memory size constraint.

15. The method of claim 12, further comprising the radio link control entity not negatively acknowledging the downlink RLC protocol data units (PDUs) that were received in the old receiver buffer window but which are outside the new receiver buffer window.

16. A method of operating a user equipment unit which communicates over an air interface with a radio access network, the method comprising the steps of:
  using a radio link control entity to form uplink RLC protocol data units (PDUs) for transmission over the air interface and to receive downlink RLC protocol data units (PDUs) over the air interface);
  storing the uplink RLC protocol data units (PDUs) in a transmitter buffer of a radio link control (RLC) buffer memory;
  storing the downlink RLC protocol data units(PDUs) in a receiver buffer of the radio link control (RLC) buffer memory;
  during a RLC reconfiguration wherein the user equipment unit is directed to reconfigure at least one of (a) a size of a transmitter buffer window to form a new transmitter buffer window having a transmitter buffer window size smaller than an old transmitter buffer window; and (b) a size of a receiver buffer window to form a new receiver buffer window having a receiver buffer window size smaller than an old receiver buffer window;
  retaining all downlink RLC protocol data units (PDUs) stored in the receiver buffer even if outside the new receiver buffer window until the receiver buffer window can be advanced; and,
  retaining any uplink RLC protocol data units (PDUs) stored in the transmitter buffer, whose receipt by the radio access network has not been positively acknowledged, even if outside the new transmitter buffer window.

17. The method of claim 16, further comprising the step of the radio link control entity checking whether receipt of a Service Data Unit (SDU) from a high layer would exceed capacity of the radio link control (RLC) buffer memory.

18. The method of claim 17, further comprising the step of the radio link control entity checking for acknowledge mode RLC entities whether the buffer memory is sufficient to store acknowledge mode RLC protocol data units (AMD PDUs) having a sequence number SN which satisfies VT(A) <SN<VT(S), wherein VT(A) is a sequence number following the last in-sequence acknowledged AMD PDU; and VT(S) is a sequence number for a next AMD PDU to be transmitted for a first time.

19. The method of claim 16, further comprising the step of the radio link control entity checking whether receipt of a Protocol Data Unit (PDU) from the radio access network would exceed capacity of the radio link control (RLC) buffer memory.

20. The method of claim 19, further comprising the step of the radio link control entity checking for acknowledge mode RLC entities whether the buffer memory is sufficient to store acknowledge mode RLC protocol data units (AMD PDUs) having a sequence number SN which satisfies VR(R) <SN<VR(H), wherein VR(R) is a sequence number following the last in-sequence AMD PDU received; and VR(H) is a sequence number following a highest sequence number of any received AMD PDU.

21. A method of operating a radio access node of a radio access network which communicates over an air interface with a user equipment unit, the method comprising the steps of:
  using a radio link control entity to form uplink RLC protocol data units (PDUs) for transmission over the air interface and to receive downlink RLC protocol data units (PDUs) over the air interface;
  storing the uplink RLC protocol data units (PDUs) in a transmitter buffer of a radio link control (RLC) buffer memory;
  storing the downlink RLC protocol data units (PDUs) in a receiver buffer of the radio link control (RLC) buffer memory;
  during a RLC reconfiguration, reconfiguring at least one of a size of a transmitter buffer window and a size of a receiver buffer window by:
    (A) retaining all downlink RLC protocol data units (PDUs) upon reconfiguration; and,
    (B) retaining all uplink RLC protocol data units (PDUs) upon reconfiguration.

* * * * *